United States Patent
Chatterjee et al.

(10) Patent No.: US 10,536,554 B2
(45) Date of Patent: Jan. 14, 2020

(54) OPTIMIZATION OF USER INTERACTIONS BASED ON CONNECTION VALUE SCORES

(71) Applicant: Microsoft Technology Licensing, LLC, Redmond, WA (US)

(72) Inventors: Shaunak Chatterjee, Sunnyvale, CA (US); Shilpa Gupta, Mountain View, CA (US); Romer E. Rosales, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 14/726,979

(22) Filed: Jun. 1, 2015

(65) Prior Publication Data

US 2016/0350309 A1 Dec. 1, 2016

(51) Int. Cl.
*H04L 29/08* (2006.01)
*G06Q 50/00* (2012.01)
*G06Q 10/06* (2012.01)
*G06Q 30/02* (2012.01)

(52) U.S. Cl.
CPC .... *H04L 67/306* (2013.01); *G06Q 10/063112* (2013.01); *G06Q 30/02* (2013.01); *G06Q 50/01* (2013.01); *H04L 67/22* (2013.01)

(58) Field of Classification Search
CPC ....... H04L 67/306; H04L 67/22; G06Q 50/01; G06F 17/30867
See application file for complete search history.

(56) References Cited

U.S. PATENT DOCUMENTS

| | | | | |
|---|---|---|---|---|
| 7,818,392 B1* | 10/2010 | Martino | ................ | G06Q 10/10 709/200 |
| 9,075,766 B2* | 7/2015 | Palmert | ............ | G06F 15/17306 |
| 9,363,223 B2* | 6/2016 | Arquette | ................ | H04L 51/32 |
| 9,584,465 B2* | 2/2017 | Arquette | ................ | H04L 51/32 |
| 2012/0023030 A1* | 1/2012 | Jeffries | ................ | G06Q 10/10 705/319 |
| 2012/0110080 A1* | 5/2012 | Panyam | ................ | G06Q 50/01 709/204 |
| 2013/0238751 A1* | 9/2013 | Raleigh | ................ | H04L 67/20 709/217 |

(Continued)

*Primary Examiner* — Robert W Beausoliel, Jr.
*Assistant Examiner* — Arthur Ganger
(74) *Attorney, Agent, or Firm* — Hickman Palermo Becker Bingham LLP

(57) ABSTRACT

Techniques are provided for optimization of user interactions based on connection value scores. A method may comprise receiving input that indicates a selection of one or more social network activities to optimize for a particular member of a social network. The method may also comprise, based on the selection of the one or more social network activities, calculating a connection value score for a social network connection between the particular member and each user in a plurality of other users. Calculating the connection value score may comprise identifying one or more attribute values that are correlated with the one or more social network activities. Further, the method may comprise, based on the connection value score for each user of the plurality of other users, determining a ranking of the plurality of other users. The method may also comprise determining content based on the ranking of the plurality of other users.

23 Claims, 7 Drawing Sheets

| | CONNECTION VALUE SCORE 610 | USER RANKING 602 | WORKPLACE 604 | CONTENT 606 | CONTENT RANKING 608 |
|---|---|---|---|---|---|
| USER 600A | 15 | 1 | "LINKEDIN" | "JOB POSTING FOR LINKEDIN" | 1 |
| USER 600B | 3 | 4 | "GOOGLE" | "JOB POSTING FOR GOOGLE" | 3 |
| USER 600C | 7 | 3 | "TWITTER" | "N/A" | "N/A" |
| USER 600D | 12 | 2 | "FACEBOOK" | "JOB POSTING FOR FACEBOOK" | 2 |

(56) References Cited

U.S. PATENT DOCUMENTS

| | | | | |
|---|---|---|---|---|
| 2013/0318180 | A1* | 11/2013 | Amin | H04L 65/403 |
| | | | | 709/206 |
| 2014/0136528 | A1* | 5/2014 | Anima | G06F 17/30864 |
| | | | | 707/723 |
| 2014/0297749 | A1* | 10/2014 | Jayaram | G06F 17/30106 |
| | | | | 709/204 |
| 2014/0365495 | A1* | 12/2014 | Legarda | H04L 51/046 |
| | | | | 707/740 |
| 2015/0046528 | A1* | 2/2015 | Piepgrass | G06F 15/17306 |
| | | | | 709/204 |
| 2015/0066949 | A1* | 3/2015 | Harles | G06Q 50/01 |
| | | | | 707/748 |
| 2016/0004761 | A1* | 1/2016 | Zhang | G06Q 10/10 |
| | | | | 707/740 |
| 2016/0067505 | A1* | 3/2016 | Bowers | A61N 1/3925 |
| | | | | 607/5 |
| 2016/0342679 | A1* | 11/2016 | Zhu | G06Q 30/02 |

* cited by examiner

FIG. 3

| SOCIAL NETWORK ACTIVITY 200 | VALUE DERIVED BY PARTICULAR MEMBER 300 | VALUE DERIVED BY DIFFERENT USER 302 | VALUE DERIVED BY SOCIAL NETWORKS OF PARTICULAR MEMBER AND DIFFERENT USER 304 | CONNECTION VALUE SCORE 306 |
|---|---|---|---|---|
| "PARTICULAR MEMBER SHARES A NEWS ARTICLE" | 0 | 1 | 99 | 100 |
| "DIFFERENT USER RE-SHARES THE NEWS ARTICLE" | 0 | 0 | 50 | 50 |

FIG. 4

| SOCIAL NETWORK ACTIVITY 200 | WEIGHT 400 | VALUE DERIVED BY PARTICULAR MEMBER 300 | VALUE DERIVED BY DIFFERENT USER 302 | VALUE DERIVED BY SOCIAL NETWORKS OF PARTICULAR MEMBER AND DIFFERENT USER 304 | CONNECTION VALUE SCORE 306 |
|---|---|---|---|---|---|
| "DIFFERENT USER SHARES A VIDEO" | 2 | 2 | 0 | 148 | 150 |
| "PARTICULAR MEMBER CLICKS ON THE VIDEO" | 1 | 1 | 1 | 0 | 2 |
| "SOCIAL NETWORK OF PARTICULAR MEMBER CLICKS ON THE VIDEO" | 1 | 0 | 24 | 24 | 48 |

FIG. 6

| | CONNECTION VALUE SCORE 610 | USER RANKING 602 | WORKPLACE 604 | CONTENT 606 | CONTENT RANKING 608 |
|---|---|---|---|---|---|
| USER 600A | 15 | 1 | "LINKEDIN" | "JOB POSTING FOR LINKEDIN" | 1 |
| USER 600B | 3 | 4 | "GOOGLE" | "JOB POSTING FOR GOOGLE" | 3 |
| USER 600C | 7 | 3 | "TWITTER" | "N/A" | "N/A" |
| USER 600D | 12 | 2 | "FACEBOOK" | "JOB POSTING FOR FACEBOOK" | 2 |

OPTIMIZATION OF USER INTERACTIONS BASED ON CONNECTION VALUE SCORES

FIELD OF THE DISCLOSURE

Embodiments relate to recommendation engines and, more specifically, to optimization of user interactions based on connection value scores.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A user may become a member of an online social network in pursuit of opportunities that are unavailable in a "real world" setting. For example, the user may wish to establish a relationship with otherwise unreachable users in the hopes of reaping a benefit, such as obtaining a job or client referral. However, relationships typically surpass the acquaintance phase before benefits may be derived. For example, an acquaintance is less likely to help the user than a close friend. Furthermore, the somewhat anonymous nature of online social networks may exacerbate difficulties in forging significant online relationships.

A recommendation system may facilitate user interactions in an online social network. For example, a set of other users called "People You May Know" may be presented to the user. However, the user may be unable to determine which of the other users is worth an investment of time and effort in developing a significant online relationship. Additionally or alternatively, a set of content called "Jobs You May Be Interested In" or referenced as "Network Update Stream", such as content in a web feed, may be presented to the user. However, the user may be unable to determine which of the content is worth the time and effort of interaction. For example, the user may wish to know which of the content, if interacted with, is likely to result in the development of a significant online relationship. Thus, there is a need for a recommendation system that facilitates the formation and maintenance of significant online relationships.

BRIEF DESCRIPTION OF THE DRAWINGS

In the drawings:

FIG. 3 is a table that depicts an approach for calculating a connection value score for an established social network connection.

FIG. 4 is a table that depicts an approach for calculating a connection value score based on weighted social network activities.

FIG. 6 is a table that depicts an approach for making recommendations based on connection value scores.

Figure 1:
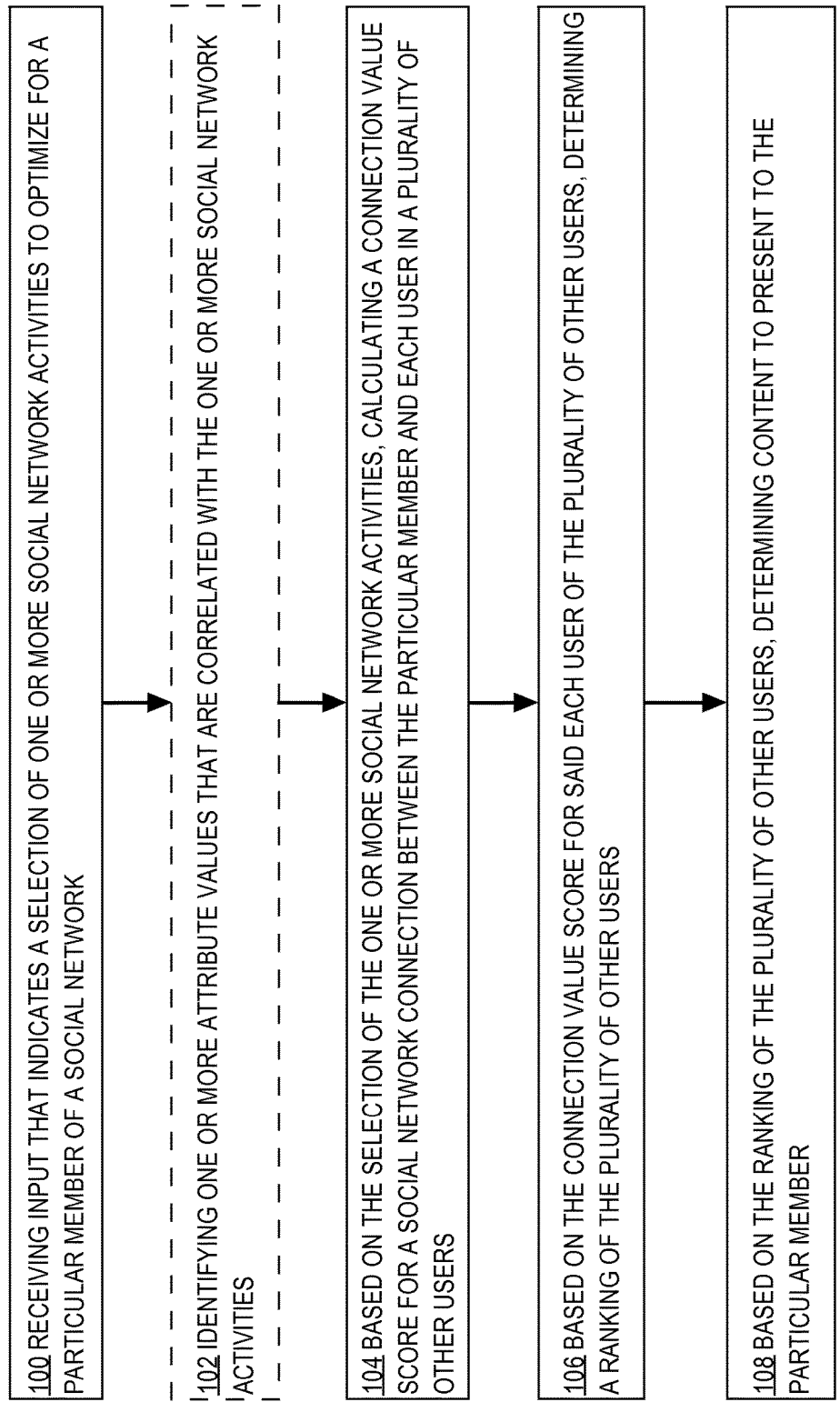
FIG. 1 is a flow diagram that depicts approaches for determining recommendations.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

General Overview

A method and system related to optimization of user interactions based on connection value scores are disclosed. In an embodiment, one or more types of user interactions may be selected for optimization. Based on the one or more types of user interactions that are selected, a connection value score may be calculated for a pair of users. The connection value score may represent a value of a social network connection between the pair of users.

By calculating connection value scores for multiple pairs of users that each involve a particular user, a ranking of other users may be determined for the particular user. When the particular user is unconnected to each of the other users, the ranking of the other users may be used to recommend the other users as potential friends or connections to the particular user. When the particular user is connected to each of the other users, the ranking of the other users may be used to recommend content to the particular user. For example, the particular user may be presented with web feed updates that are sorted in an order that corresponds to the ranking of the other users who caused the web feed updates to be posted.

Process Overview

FIG. 1 is a flow diagram that depicts approaches for determining recommendations. At block 100, input is received that indicates a selection of one or more social network activities to optimize for one or more members of a social network. Input may be received from a person (e.g., an administrator) who is authorized to select social network activities to optimize for a social network. Optimizing the one or more social network activities may involve increasing occurrences of the one or more social network activities. For example, optimizing feed clicks may involve a multi-objective optimization (MOO) that simultaneously increases content postings on web feeds and consumption of the content that is posted.

The one or more social network activities may be optimized for a particular member and/or a set of users that includes the particular member. The set of users may include members of the social network of the particular member (i.e., different users who have established social network connections with the particular member). The set of users may include users who are outside the social network of the particular member. For example, the one or more social network activities may be optimized for all registered users of a social network service, including the particular member.

At optional block 102, one or more attribute values that are correlated with the one or more social network activities are identified. The one or more attribute values may include user characteristics. A correlation may indicate a causal relationship between the one or more attribute values and the one or more social network activities. A classifier may correlate the one or more attribute values with the one or more social network activities. For example, a classifier may determine that a completeness of a user profile is a factor in causing user profile views.

At block 104, based on the selection of the one or more social network activities, a connection value score is calculated for a social network connection between the particular member and each user in a plurality of other users. When a social network connection between two users is yet to be established, the connection value score may be calculated based on the one or more attribute values that are correlated with the one or more social network activities. For example, a user behavior model may predict a connection value score based on the one or more attribute values of the particular member and a user outside the social network of the particular member. Additionally or alternatively, when a social network connection exists between two users, the connection value score may be calculated by counting the occurrences of the one or more social network activities within a predetermined time period.

The plurality of other users may be determined based on one or more commonalities shared with the particular member. Examples of commonalities between a particular member and another user include having attended the same school, having worked at the same employer, sharing a mutual friend, and being a member of the same group or social network.

At block 106, a ranking of the plurality of other users is determined based on the connection value score for each user in the plurality of other users. For example, the ranking of the plurality of other users may sort the plurality of other users in a decreasing order of connection value scores. If none of the plurality of other users is connected to the particular member in a social network, then a subset (e.g., a top three by ranking, any users corresponding to connection value scores that exceed a predetermined threshold, etc.) of the plurality of other users may be presented to the particular member as recommendations for new social network connections. If the plurality of other users are connected to the particular member in a social network, then block 106 may lead to optional block 108.

At block 108, content to be presented to the particular member is determined based on the ranking of the plurality of other users. For example, the subset of the plurality of other users may be five users who have not yet established a social network connection with the particular member and who correspond to the top five positions in the ranking of the plurality of other users. Thus, content to be presented to the particular member may include recommendations to establish social network connections with the five users.

Example Social Network Activities

Figure 2:
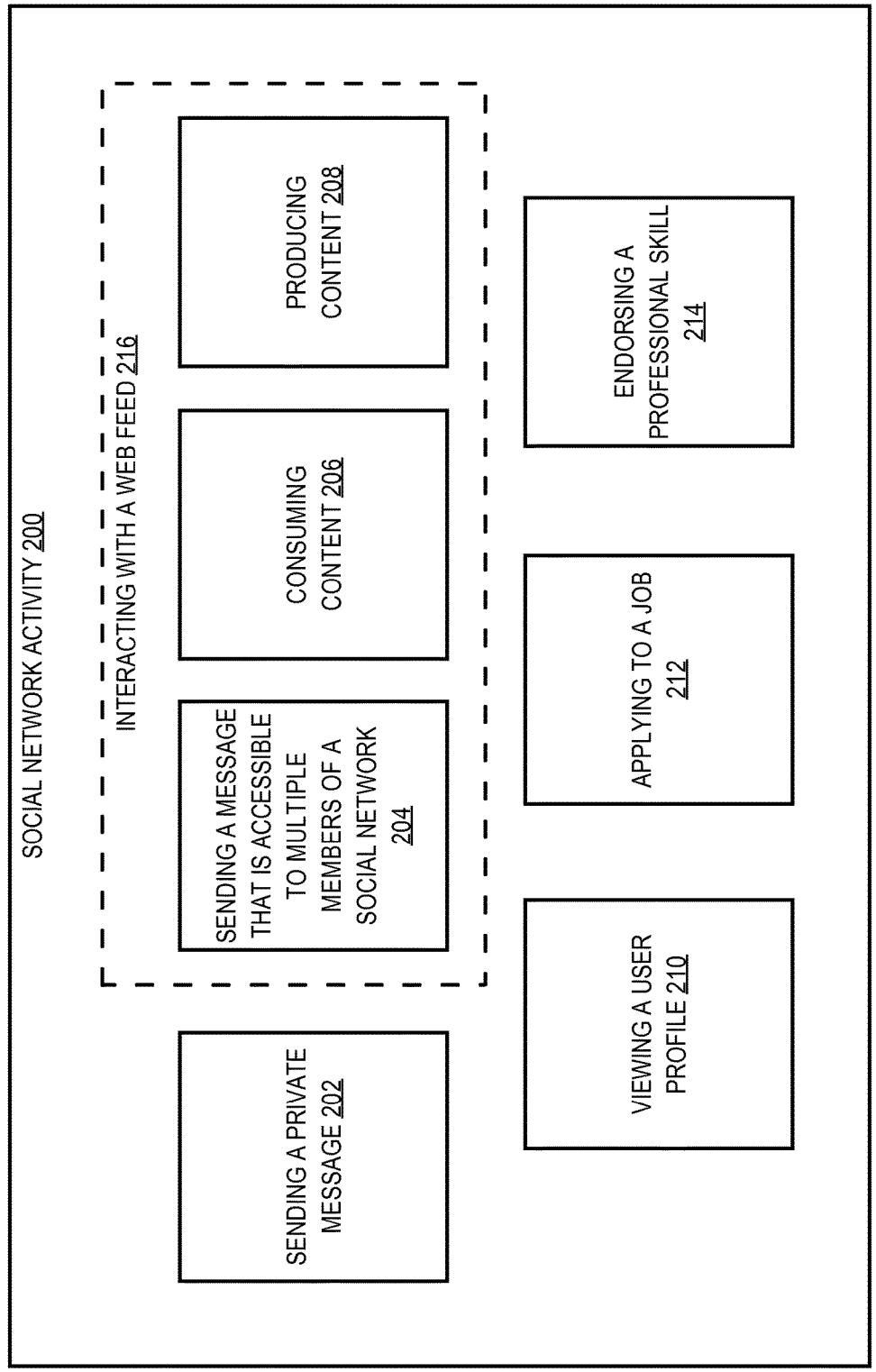
FIG. 2 is a block diagram that depicts examples of social network activities.

FIG. 2 is a block diagram that depicts examples of social network activities. In the example of FIG. 2, social network activity 200 includes sending a private message 202, sending a message 204 that is accessible to multiple members of a social network (referred to herein as a "multiple-recipient message"), consuming content 206, producing content 208, viewing a user profile 210, applying to a job 212, and/or endorsing a professional skill 214. Interacting with a web feed 216 includes sending a message 204, consuming content 206, and producing content 208.

Social network activity 200 may include one or more types of user interactions in a social network application. Social network activity 200 may include interactions between users (e.g., sending a private message 202), interactions between a user and content provided by the social network application (e.g., consuming content 206 and producing content 208), and/or interactions between a user and a feature of the social network application (e.g., sending a private message 202, viewing a user profile 210, etc.).

Sending a private message 202 may involve using an electronic message feature of a social network application. For example, the electronic message feature may be "InMail" as supported by a social network application provided by LinkedIn Corporation of Mountain View, Calif.

Sending a multi-recipient message 204 may involve causing a pre-formulated and/or customizable message to be posted on a web page and/or a web feed of a recipient member. The recipient member may share the social network with a sending member and one or more other members who can also access the message. For example, Bob may perform a "like" action on content posted by Alice, which causes a "like" message to be posted in Alice's web feed such that other members of Alice's social network may view the "like" message. Other examples of sending a multi-recipient message 204 may include a "share" action, a "comment" action, sending a "congratulations" message, and sending a "happy birthday" message.

Consuming content 206 may include viewing a video and/or an image, listening to an audio presentation, and/or reading text. Consuming content 206 may be indicated by a scrolling action and/or a "click" action on a hyperlink and/or a virtual button. For example, Bob may click on a hyperlink to read a news article that Alice caused to be posted in Bob's web feed.

Producing content 208 may include writing about a topic, drawing and/or recording an image, publishing content, and/or recording audio and/or video. For example, Bob may post, on his home page, a video he recorded of a seminar he presented, and a hyperlink to the video may appear in Alice's web feed.

Viewing a user profile 210 may involve requesting user profile information of a specific user. The user profile information may include (or otherwise indicate) an age of the user, a total number of social network connections, a length of membership in a social network, a job title, a workplace, a job industry, a work history, an educational background, a completeness of the user profile, and/or an activity level of the user in a social network.

Applying to a job 212 may involve clicking on a job posting provided by the social networking application. For example, Bob may read a job posting that is presented on his home page and click on a hyperlink that takes him to a company's web site.

Endorsing a professional skill 214 may involve vouching for the competency of another member by selecting a number of job skills from a predetermined set of job skills. For example, Bob may click an "endorse" button on Alice's home page and be prompted to select, from a set of choices, which job skills he would like other members to know that Alice has. Alternatively, instead of pre-defined job skills, an endorser may have the option to input text that indicates or describes one or more skills.

Multiple social network activities 200 may at least partially overlap and/or be combined. For example, interacting with a web feed 216 may include at least a portion of sending a multi-recipient message 204, at least a portion of consuming content 206, and/or at least a portion of producing content 208. In the example of FIG. 2, sending a multi-recipient message 204, consuming content 206, and producing content 208 are combined to form another social network activity 200 of interacting with a web feed 216. However, in an embodiment, interacting with a web feed 216 may exclude producing content 208.

Interacting with a web feed 216 may involve creating, publishing, commenting on, "liking", clicking on, and/or otherwise selecting content that is updated in a portion of a web page. For example, Bob may click on an image that Alice caused to be posted in Bob's web feed when Alice performed a "like" action on the image.

In an embodiment, a type of social network activity 200 may be divided based on content type, and individual content types may be selected for optimization. For example, consuming video content may be tracked independently of the consumption of audio content. Thus, the consumption of video content may be selected for optimization. As another example, consuming content related to politically-related news may be tracked independently of consumption of sports-related news. Thus, the consumption of certain types of content may be selected for optimization.

Connection Value Score for Established Connections

In an embodiment, a connection value score may be calculated for a pair of users that share a social network connection with each other. Calculating the connection value score may involve counting a total number of occurrences, within a predetermined time period, of one or more social network activities 200 for each user in the pair of users as well as a respective social network of each user in the pair of users. However, in an embodiment, the respective social network of each user in the pair of users may be unaccounted for in the connection value score.

FIG. 3 is a table that depicts an approach for calculating a connection value score for an established social network connection. In the example of FIG. 3, connection value score 306 is determined for social network activity 200. Connection value score 306 is calculated by adding value derived by particular member 300, value derived by different user 302, and value derived by social networks of particular member and different user 304.

Value 300 is derived by a particular member. Value 300 may be a benefit that accrues to the particular member. For example, if social network activity 200 includes sending a private message 202, then every time a different user sends a message to the particular member, value 300 may increase.

Value 302 is derived by the different user. Value 302 may be a benefit that accrues to the different user. In the example of FIG. 3, social network activity 200 may include sending a multi-recipient message 204. When the particular member shares a news article with the different user, value 302 is "1". Value 302 may differ from value 300 due to differences between the particular member and the different user. For example, value 302 may be greater than value 300 if a social network of the different user is smaller than a social network of the particular member.

Value 304 is derived by social networks of the particular member and the different user. Value 304 may be a benefit that accrues to the social networks of the particular member and the different user. For example, in FIG. 3, when the particular member shares the news article, the particular member may cause a hyperlink to the news article to be posted in a respective web feed of each member in the social network of the particular member. The social network of the particular member may include the different user and ninety-nine other members. Thus, "99" is value 304 that is associated with the particular member's sharing of the news article. In another example, in FIG. 3, when the different user re-shares the news article, the different user may cause a hyperlink to the news article to be posted in a respective web feed of each member in the social network of the different user. The social network of the different user may include fifty members who are outside the social network of the particular member. Thus, "50" is value 304 that is associated with the different user's re-sharing of the news article.

Connection value score 306 may be a metric that indicates how beneficial a relationship between a pair of users is/will be. Connection value score 306 may be determined for each social network activity 200 and/or aggregated across multiple social network activities 200 to obtain a single connection value score 306 for a pair of users. In the example of FIG. 3, "100" is connection value score 306 that is associated with the particular member's sharing of the news article, and "50" is connection value score 306 that is associated with the different user's re-sharing of the news article. Thus, "150" may be a total connection value score for the social network connection between the particular member and the different user with respect to sending a multi-recipient 204. Additionally, connection value score 306 may be aggregated across multiple pairs of users to obtain a single connection value score 306 for a group of users that share a similarity, such as a common job industry, a common educational background, a common length of membership in a social network, etc.

In an embodiment, connection value score 306 may be predicted for a time period that extends into the future. A future trend in connection value score 306 for a pair of users may be determined based on an extrapolation of a historic trend in connection value score 306. The extrapolation may be based on a linear regression analysis, a logistic regression analysis, and/or any other machine-learning technique. The historic trend may include behavioral patterns of users who are similarly situated to the pair of users. For example, a connection value score 306 six months in the future may be predicted for a newly connected pair of users based on the behavioral patterns of the newly connected pair of users as well as other newly connected pairs of users.

Classifiers, whether used to weight social network activities 200 or to correlate user characteristics with social network activities 200, may be trained on the historic trend and may change dynamically as more behavioral data is collected. A classifier may be dedicated to each type of social network activity 200 and/or to each combination of social network activities 200. For example, a classifier may be trained on the social network activity 200 of consuming content 206 only. In another example, a classifier may be trained on the social network activity 200 consisting of consuming content 206 and producing content 208. In yet another example, a classifier may be trained on all social network activities 200 simultaneously.

Weighting Social Network Activities

When multiple social network activities 200 are selected, calculating connection value score 306 may involve weighting each social network activity 200. Weighted social network activities may be used to calculate connection value score 306 for a pair of users with an established connection or for a pair of users who have yet to establish a social network connection. FIG. 4 is a table that depicts an approach for calculating connection value score 306 based on weighted social network activities. In the example of FIG. 4, weight 400 is applied to social network activity 200 to calculate a value derived by particular member 300, a value derived by different user 302, and a value derived by social networks of particular member and different user 304, which are summed to determine connection value score 306.

Weight 400 may be determined for each social network activity 200. In the example of FIG. 4, weight 400 may be a coefficient that is multiplied to value 300, value 302, and/or value 304. A classifier may determine and/or re-determine weight 400 based on monitoring user behavior of a set of users. The user behavior may include one or more social network activities 200.

In the example of FIG. 4, social network activity 200 may include sending a multi-recipient message 204, consuming content 206, and producing content 208, which may be components of interacting with a web feed 216. Sending a multi-recipient message 204 may be assigned a weight 400 of "2". When the different user shares a video, the different user causes the video to be posted in the web feeds of the particular member and seventy-four other members in the different user's social network. Thus, value 300 and value 304 are "2×1" and "2×74", respectively, for a connection value score 306 of "150" with respect to sending a message that is accessible to multiple members of a social network 204.

In the example of FIG. 4, consuming content 206 and producing content 208 may each be assigned a weight 400 of "1". When the particular member clicks on the video, value 300 may be a consumer value that is measured by generating a "click" action, and value 302 may be a producer value that is measured by receiving a click on the video. Thus, value 300 is "1" and value 302 is "1" for a connection value score 306 of "2" when the particular member clicks on the video. When the social network of the particular member clicks on the video, value 304 may be a consumer value for each of the twenty-four other members who clicked on the video. Thus, value 302 is "24" and value 304 is "24" for a connection value score 306 of "48" when the social network of the particular member clicks on the video.

Connection value score 306 may be calculated for a single social network activity 200 and/or multiple social network activities 200. In the example of FIG. 4, "25" is connection value score 306 with respect to consuming content 206 (particular member and twenty-four other members click on the video), and "25" is connection value score 306 with respect to producing content 208 (a total number of clicks the different user caused). If "150" is added for sending a multi-recipient message 204, "200" is a total connection value score 306 with respect to a social network connection between the particular member and the different user.

Connection Value Score Based on Attribute Values

In an embodiment, a pair of users may have yet to establish a social network connection with each other. Calculating a connection value score for the pair of users may involve identifying one or more user characteristics that are related to the one or more social network activities 200 that are selected. As with the connection value score for an already connected pair of users, the connection value score for an unconnected pair of users may, in an embodiment, refrain from accounting for a respective social network of each user in the pair of users.

Figure 5:
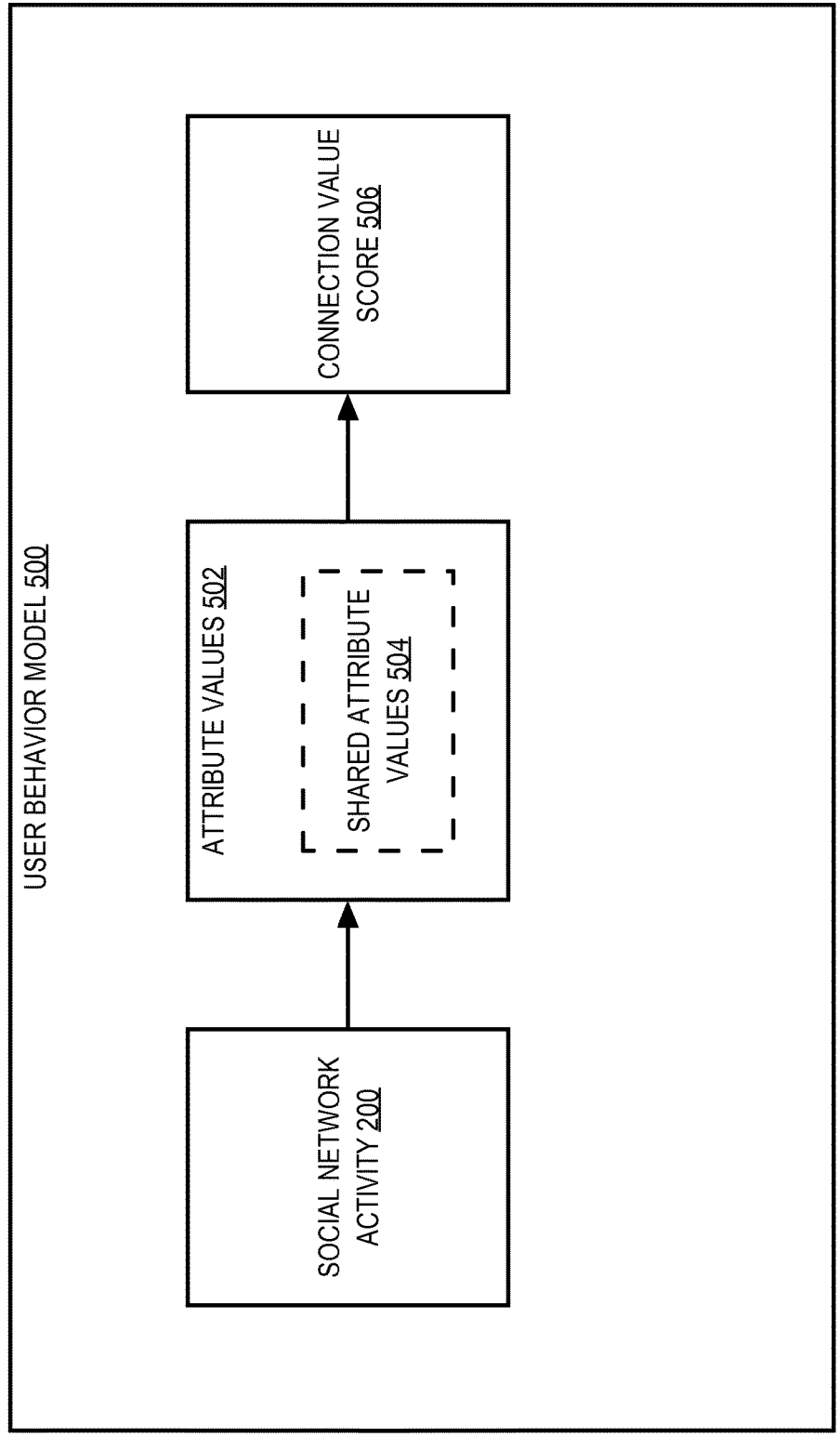
FIG. 5 is a block diagram that depicts an approach for calculating a connection value score based on attribute values.

FIG. 5 is a block diagram that depicts an approach for calculating a connection value score 506 based on attribute values. In the example of FIG. 5, user behavior model 500 correlates social network activity 200 with attribute values 502 that are used to determine connection value score 506. Attribute values 502 include shared attribute values 504 that may also be used to determine connection value score 506.

For an unestablished social network connection, counting occurrences of one or more social network activities 200 may be infeasible, because an unconnected pair of users may be unable to interact with each other. Thus, attribute values 502 may serve as substitutes for the occurrences of the one or more social network activities 200. Although for some social network activities 200, such as consuming content 206 and producing content 208, connection value score 506 for an unconnected pair of users may be roughly approximated by simply pairing up users based on past behavior, such as by pairing up content consumers with content producers. However, this rough approximation may fail to account for a synergy between a pair of users. For example, based solely on content consumption and production counts in pairings with other users, it may be difficult to predict how much content produced by a particular content producer will actually be consumed by a particular content consumer who is unconnected to the particular content producer. The particular content producer and the particular content consumer may simply be interested in different types of content. Of course, this problem may be addressed by increasing the granularity of social network activity 200 to be the consumption and production of a specific type of content, but a connection value score may decline in significance as granularity is increased. Thus, attribute values 502 that reflect the personalities causing the behavior may accurately predict connection value scores while avoiding any increase in the granularity of the social network activity 200 being optimized.

Attribute values 502 may be user characteristics, such as an age, a total number of social network connections, a length of membership in a social network, a job title, a workplace, a job industry, a work history, an educational background, a completeness of a user profile, and/or an activity level in a social network. Classifiers may be used to correlate attribute values 502 with the one or more social network activities 200.

In an embodiment, user behavior model 500 is used to correlate one or more attribute values 502 with one or more social network activities 200. User behavior model 500 may be based on behavioral data obtained by monitoring past behavior of a set of users. The past behavior may include one or more social network activities 200. User behavior model 500 may take as input attribute values 502 of a particular member and one or more social network activities 200 that are selected for optimization. User behavior model 500 may include classifiers that determine and/or re-determine which of attribute values 502 to correlate with the one or more social network activities 200 that are selected. For example, based on the behavioral data, classifiers may determine that users who have been members of a social network for less than a year are most likely to interact with other members by endorsing a professional skill 214.

User behavior model 500 may determine connection value score 506 for a pair of users based on attribute values 502 for each user. For example, user behavior model 500 may predict a connection value score 506 of "250" for a pair of users that includes Alice, who has over five hundred social network connections, and Bob, who is less than thirty years old. User behavior model 500 may determine connection value score 506 based on the behavioral data of one or more similarly situated users. The one or more similarly situated users may share one or more attribute values 502 with the pair of users. For example, connection value score 506 for an unestablished social network connection between Alice and Bob may be based on a connection value score for an established social network connection between Carol, who has over five hundred social network connections, and David, who is less than thirty years old. In another example, connection value score 506 for Alice and Bob may be based on a connection value score for an established social network connection between Alice and Edward, who is less than thirty years old.

In an embodiment, one or more social network activities 200 that are selected for optimization may be correlated with one or more shared attribute values 504. The one or more shared attribute values 504 may be a subset of attribute values 502 that are common to each user in a pair of users. For example, endorsing a professional skill 214 may be correlated with a shared attribute value 504 of a common workplace.

When multiple social network activities 200 are selected for optimization, connection value score 506 may be determined by weighting one or more attribute values 502 that are correlated with the multiple social network activities. The weighting may be determined and/or re-determined based on behavioral data obtained from monitoring social network activities 200 for a set of users. Classifiers may determine and/or re-determine the weighting based on the behavioral data that is collected.

In an embodiment, a pair of users may include a particular member and a different user who is selected from a set of users who share a similarity with the particular member. The similarity may be in an educational background, a work history, social network connections, etc. Thus, the similarity increases a likelihood that a pair of users who have yet to establish a social network connection with each other will establish the social network connection. When the pair of users establishes the social network connection with each other, connection value score 506 may be determined by counting occurrences of one or more social network activities 200.

Recommendations Based on Connection Value Scores

When connection value scores 610 are calculated for different users who are each paired with a particular member, one or more of the different users and/or content associated with one or more of the different users may be recommended to the particular member based on the connection value scores 610.

FIG. 6 is a table that depicts an approach for making recommendations based on connection value scores 610. In the example of FIG. 6, each user in users 600A-D is associated with a connection value score 610, a user ranking 602, and a workplace 604. Each user in a subset of users 600A-D is also associated with content 606 and a content ranking 608.

In FIG. 6, each of users 600A-D represents a different user who is paired with a particular member to determine connection value score 610 for a social network connection between the different user and the particular member. Connection value scores 610 "15", "3", "7", and "12" correspond to user 600A, user 600B, user 600C, and user 600D, respectively. User ranking 602 may be determined for a subset of users 600A-D based on a sorted order of connection value scores 610. The subset may include a predetermined number of users with the highest connection value scores 610 and/or any of users 600A-D with a connection value score 610 that exceeds a predetermined threshold. In the example of FIG. 6, the subset of users 600A-D may include all of users 600A-D based on the four highest connection value scores 610 and/or connection value scores exceeding "5". Thus, user rankings 602 of "1", "2", "3", and "4" correspond to user 600A, user 600D, user 600C, and user 600B, respectively.

If a social network connection between the particular member and the different user has not yet been established, then user ranking 602 may be used to recommend the different user as a social network connection to the particular member. For example, the particular member may be presented with a list of recommended social network connections to establish. The top of the list may correspond to the social network connection associated with the highest connection value score 610 and/or user ranking 602.

If a social network connection between the particular member and the different user has already been established, then user ranking 602 may be used to recommend a set of content 606 to the particular member. For example, content 606 may include news articles, videos, etc. that users 600A-D caused to be posted in the particular member's web feed. User ranking 602 may be used to generate content ranking 608. Based on content ranking 608, a set of content 606 may be recommended to the particular member.

In the example of FIG. 6, content 606 includes job postings for a workplace 604 associated with a user in users 600A-D. Attribute values 502 may include workplace 604, which represents a current and/or previous workplace of a user in users 600A-D. Since user 600C is unassociated with any job postings, content rankings 608 of "1", "2", and "3" correspond to user 600A, user 600D, and user 600B, respectively. Thus, the particular member may be presented with a list of job postings with a job posting for LinkedIn at the top of the list.

Changes in a Connection Value Score

In an embodiment, a connection value score for a pair of users changes over time. One or more factors may cause a change in connection value score. An example factor is a change in the set of one or more social network activities 200 that is being optimized. For example, at time T1, viewing a user profile 210 is selected for optimization. Later, at time T2, endorsing a professional skill 214 is selected for optimization. If the connection value score is based primarily on profile views, then a connection value score calculated for a pair of users at time T2 may be lower than the connection value score calculated for the pair of users at time T1. Another example factor is a change in behavior of one or both of the users in a pair. For example, if a first user ceases to consume content produced by a second user, then the connection value score for that pair of users may decrease.

Selecting Social Network Activities for Optimization

In an embodiment, different social network activities 200 may be optimized for different subsets of users. For example, at a given point in time, three different social network activities 200 may be concurrently optimized for three different types of users: Applying to a job 212 may be optimized for students, endorsing a professional skill 214 may be optimized for business executives, and producing content 208 may be optimized for software engineers.

In an embodiment, a particular user may be authorized to select one or more social network activities 200 for optimization that applies to the particular user and other users, such as existing connections of the particular user and/or users that are not yet connected to the particular user. Thus, each user may customize the manner in which his/her social network is to grow. For example, Alice may be a new user who wishes to grow her social network by increasing profile views, whereas Bob may be a veteran user who wishes to strengthen existing relationships by increasing endorsements.

Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
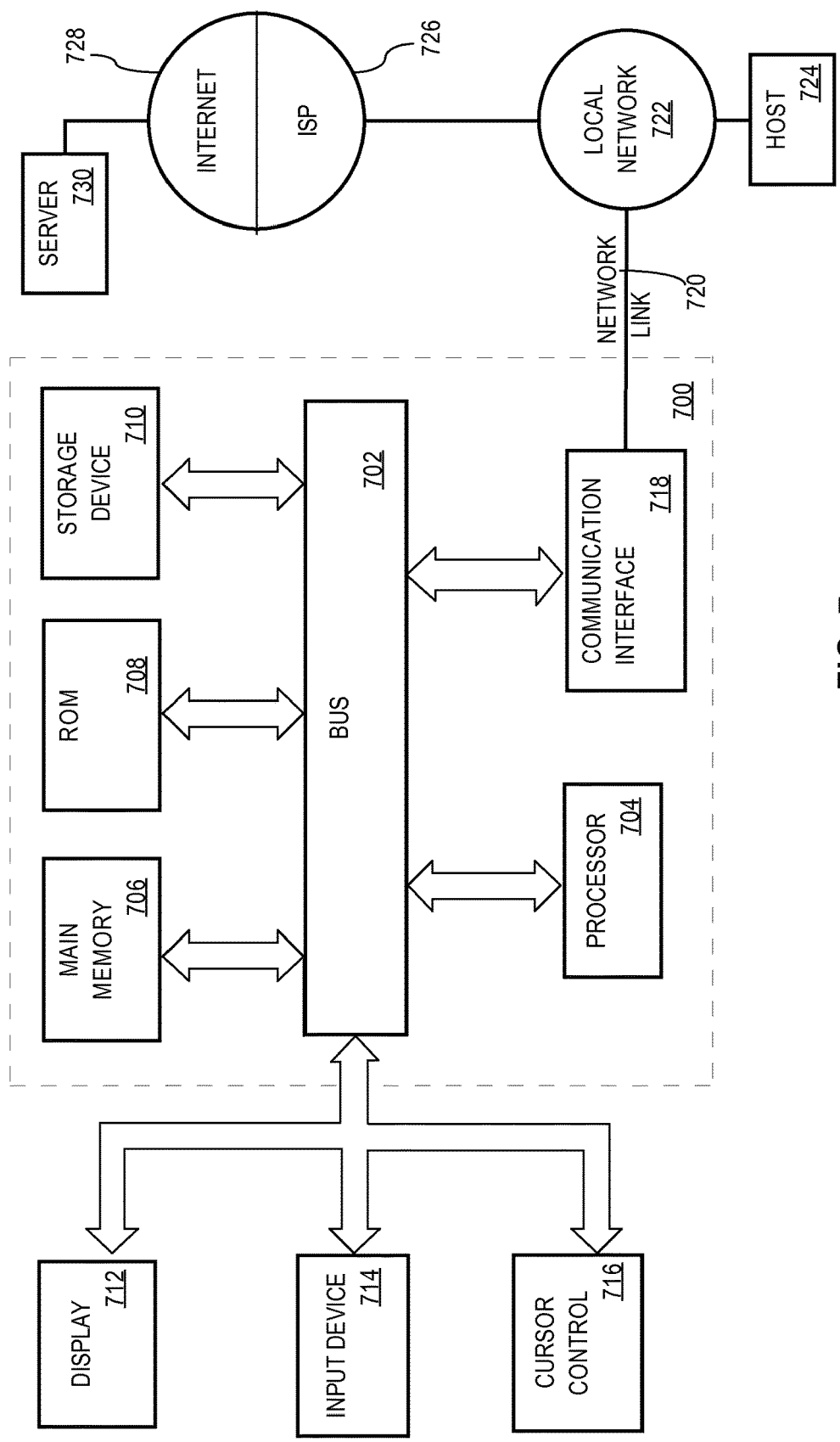
FIG. 7 depicts a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
receiving input that indicates a selection of one or more social network activities to optimize for a particular member of a social network;
identifying a plurality of other users;
based on the selection of the one or more social network activities, calculating a connection value score for a social network connection between the particular member and each user in the plurality of other users, wherein the connection value score is based on a value derived by members in a social network, of the particular member or of said each user, other than the particular member or said each user;
based on the connection value score for said each user of the plurality of other users, determining a ranking of the plurality of other users;
based on the ranking of the plurality of other users, identifying content to present to the particular member;
wherein identifying the content to present to the particular member comprises, based on the ranking of the plurality of other users, determining a ranking of a plurality of content items, each of which is associated with a different user in a subset of the plurality of other users, wherein a content item in the plurality of content items is either (a) first content with which a user in the subset of the plurality of other users has interacted or (b) job postings associated with workplaces of the subset of the plurality of other users, wherein the first content with which the user in the subset has interacted comprises content on which the user has commented, on which the user has clicked, or which the user has published;
causing the content to be presented to the particular member;
wherein the method is performed by one or more computing devices.

2. The method of claim 1, wherein calculating the connection value score comprises identifying one or more attribute values that exhibit a causal relationship with the one or more social network activities.

3. The method of claim 2, wherein the one or more attribute values comprise one or more shared attribute values that are associated with the particular member and another user in the plurality of other users.

4. The method of claim 2, wherein the connection value score is calculated based on a user behavior model that determines the one or more attribute values exhibit the causal relationship with the one or more social network activities.

5. The method of claim 1, wherein:
the content comprises content with which the corresponding user in the subset of the plurality of other users has interacted;
a user interacts with certain content by creating the certain content, publishing the certain content, providing a comment on the certain content, or otherwise selecting the certain content.

6. The method of claim 1, wherein the connection value score is calculated based on different weights that are assigned to different social network activities.

7. The method of claim 6, wherein the one or more weights are re-assigned based on data gathered from monitoring the one or more social network activities.

8. The method of claim 1, wherein the one or more social network activities comprise sending a private message.

9. A method comprising:
receiving input that indicates a selection of one or more social network activities to optimize for a particular member of a social network;
identifying a plurality of other users;
based on the selection of the one or more social network activities, calculating a connection value score for a social network connection between the particular member and each user in the plurality of other users, wherein the connection value score is based on a value derived by members in a social network, of the particular member or of said each user, other than the particular member or said each user;
based on the connection value score for said each user of the plurality of other users, determining a ranking of the plurality of other users;
based on the ranking of the plurality of other users, identifying content to present to the particular member;
wherein identifying the content comprising:
making a determination that a particular user in the plurality of other users is associated with a workplace and that a job posting is associated with the workplace;
selecting the job posting as a candidate for presentation to the particular member based on the determination;
wherein identifying content to present to the particular member comprises, based on the ranking of the plurality of other users, determining a ranking of a plurality of content items, each of which is associated with a different user in a subset of the plurality of other users;

wherein at least one content item in the plurality of content items is the job posting;

causing the content to be presented to the particular member;

wherein the method is performed by one or more computing devices.

10. A system comprising:

one or more processors; and one or more non-transitory storage media storing instructions which, when executed by the one or more processors, cause:

receiving input that indicates a selection of one or more social network activities to optimize for a particular member of a social network;

based on the selection of the one or more social network activities, calculating a connection value score for a social network connection between the particular member and each user in a plurality of other users;

wherein calculating the connection value score for the social network connection between the particular member and each user in the plurality of other users comprises:

determining, based on the one or more social network activities, a first value derived by the particular member, determining, based on the one or more social network activities, a second value derived by said each user, determining, based on the one or more social network activities, a third value derived by members in a social network, of the particular member or of said each user other than the particular member or said each user, and calculating the connection value score based on the first value, the second value, and the third value;

based on the connection value score for each user of the plurality of other users, determining a ranking of the plurality of other users;

based on the ranking of the plurality of other users, identifying content to present to the particular member;

causing the content to be presented to the particular member.

11. The system of claim 10, wherein calculating the connection value score comprises identifying one or more attribute values that exhibit a causal relationship with the one or more social network activities.

12. The system of claim 11, wherein the one or more attribute values comprise one or more shared attribute values that are associated with the particular member and another user in the plurality of other users.

13. The system of claim 11, wherein the connection value score is calculated based on a user behavior model that determines the one or more attribute values exhibit the causal relationship with the one or more social network activities.

14. The system of claim 10, wherein said each user in the plurality of other users has yet to establish the social network connection with the particular member when the connection value score is calculated.

15. The system of claim 10, wherein identifying content to present to the particular member comprises:

based on the ranking of the plurality of other users, determining a ranking of particular content that is associated with a subset of the plurality of other users.

16. The system of claim 15, wherein:

the particular content comprises content with which each user in the subset of the plurality of other users has interacted;

a user interacts with certain content by creating the certain content, publishing the certain content, providing a comment on the certain content, or otherwise selecting the certain content.

17. The system of claim 15, wherein the particular content comprises job postings associated with workplaces of the subset of the plurality of other users.

18. The system of claim 15, wherein the particular content comprises information about each user in the subset of the plurality of other users, wherein the instructions, when executed by the one or more processors, further cause displaying certain content that invites the particular member to connect to each user in the subset.

19. The system of claim 10, wherein the connection value score is calculated based on different weights that are assigned to different social network activities.

20. The system of claim 19, wherein the one or more weights are re-assigned based on data gathered from monitoring the one or more social network activities.

21. The system of claim 10, wherein the one or more social network activities comprise sending a private message.

22. The system of claim 10, wherein the instructions, when executed by the one or more processors, further cause;

receiving second input that indicates a selection of one or more other social network activities to optimize for the particular member of the social network;

based on the selection of the one or more other social network activities, calculating a second connection value score for the social network connection between the particular member and said each user in the plurality of other users;

based on the second connection value score for said each user of the plurality of other users, determining a second ranking of the plurality of other users;

based on the second ranking of the plurality of other users, identifying second content to present to the particular member;

causing the second content to be presented to the particular member.

23. The system of claim 22, wherein the one or more social network activities comprise applying to a job posting provided by a social network application, and wherein the one or more other social network activities comprise endorsing a professional skill.

* * * * *